US007065206B2

(12) United States Patent
Pan

(10) Patent No.: US 7,065,206 B2
(45) Date of Patent: Jun. 20, 2006

(54) METHOD AND APPARATUS FOR ADAPTIVE ECHO AND NOISE CONTROL

(75) Inventor: Jianhua Pan, Libertyville, IL (US)

(73) Assignee: Motorola, Inc., Schaumburg, IL (US)

( * ) Notice: Subject to any disclaimer, the term of this patent is extended or adjusted under 35 U.S.C. 154(b) by 169 days.

(21) Appl. No.: 10/718,157

(22) Filed: Nov. 20, 2003

(65) Prior Publication Data

US 2005/0111655 A1 May 26, 2005

(51) Int. Cl.
H04M 3/23 (2006.01)
H04B 15/00 (2006.01)
H04M 9/08 (2006.01)
(52) U.S. Cl. ............... 379/406.03; 379/392.01
(58) Field of Classification Search ........... 379/392.01, 379/406.09
See application file for complete search history.

(56) References Cited

U.S. PATENT DOCUMENTS

| 5,617,472 A * | 4/1997 | Yoshida et al. ........ 379/392.01 |
| 5,680,393 A * | 10/1997 | Bourmeyster et al. . 379/406.01 |
| 5,687,075 A | 11/1997 | Stothers |
| 5,691,893 A | 11/1997 | Stothers |
| 5,768,124 A | 6/1998 | Stothers et al. |
| 6,108,412 A * | 8/2000 | Liu et al. ............... 379/406.09 |

OTHER PUBLICATIONS

Regine Le Bouquin Jeannes, Pascal Scalart, Gerard Faucon and Christophe Beaugeant, "Combined Noise and Echo Reduction in Hands-Free Systems: A Survey", IEEE Transactions on Speech and Audio Processing, vol. 9, No. 8, Nov. 2001, 13 pages.

* cited by examiner

Primary Examiner—Daniel Swerdlow
(74) Attorney, Agent, or Firm—Matthew C. Loppnow

(57) ABSTRACT

A method and apparatus for adaptive echo and noise control. A signal can be received at an input to a communication or electronic device. Background noise in the signal can be determined. The order of noise suppression and echo cancellation can be adaptively determined based on the background noise in the signal. Adaptively determining the order of noise suppression and echo cancellation can be performed by comparing the background noise to at least one threshold, performing echo cancellation prior to noise suppression on the signal if the background noise is below the at least one threshold, and performing noise suppression prior to echo cancellation on the signal if the background noise is above the at least one threshold.

20 Claims, 4 Drawing Sheets

METHOD AND APPARATUS FOR ADAPTIVE ECHO AND NOISE CONTROL

BACKGROUND

1. Field

The present disclosure is directed to a method and apparatus for adaptive echo and noise control. More particularly, the present disclosure is directed to a method and apparatus for reconfiguring noise suppression and echo cancellation based on noise conditions.

2. Description of Related Art

Presently, communication devices are used in a variety of environments that have a variety of noise levels. For example, a mobile phone may be used in an office, at an amusement park, at a sporting event, at a party, in a car, or elsewhere. As another example, a traditional phone may be used in an office, at a construction site, in a home, or elsewhere. Unfortunately, these different environments with different noise levels cause a problem in that the different noise levels can make communication difficult. Thus, noise suppression may be used with communication devices to enhance communication. This creates an additional problem in determining the proper amount of noise suppression for optimal communication quality.

Another problem exists because many communication devices may have loud speakers or may use speakerphones or car kits to provide handsfree operation. This causes the problem of acoustic echo which can cause a user to hear an echo of what was communicated on the communication device. This echo is caused by the microphone of a communication device picking up the audio output by a speaker thus causing the communication device to resend audio originally sent by an originator back to the originator. This echo can be very disruptive to voice communication based on the echo magnitude and the time delay to when the echo is heard by the originator. To overcome the echo problem, an adaptive echo canceller can be used. Unfortunately, echo cancellation performance is severely affected by the near-end environmental noise and by the presence of near-end speech, such as doubletalk. The performance may be suboptimal when used in a noisy environment, and it even may be non-effective when used in a noisy environment together with doubletalk Furthermore, the use of noise suppression along with echo cancellation can cause additional problems. These problems are caused because the signal resulting from noise suppression can result in less efficient echo cancellation. Furthermore, echo cancellation in a noisy environment may be inefficient when performed prior to noise suppression.

Thus, there is a need for a method and apparatus for adaptive echo and noise control.

BRIEF DESCRIPTION OF THE DRAWINGS

The embodiments of the present invention will be described with reference to the following figures, wherein like numerals designate like elements, and wherein.

DETAILED DESCRIPTION

Figure 1:
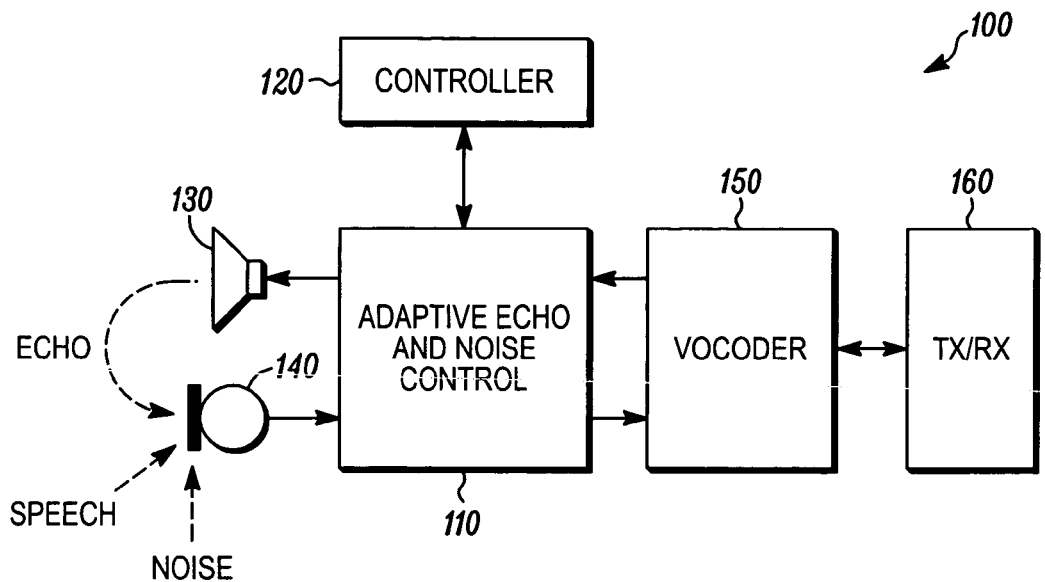
FIG. 1 is an exemplary block diagram of a communication device according to one embodiment.

The disclosure provides a method and apparatus for adaptive echo and noise control. According to one embodiment, the present disclosure provides an electronic device. The electronic device can include an audio input configured to receive a received signal, an audio output configured to output an output signal, a transceiver configured to transmit a transmitted signal, and an adaptive echo and noise control system coupled to the audio input, the audio output, and the transceiver. The adaptive echo and noise control system can include an echo canceller and a noise suppressor. The adaptive echo and noise control system can be configured to adaptively determine the order of echo cancellation and noise suppression based on an amount of noise in the received signal to generate a desired signal. The adaptive echo and noise control system can also be configured to send the desired signal to the transceiver.

The echo canceller can include a least mean square (LMS) adaptive filter and doubletalk detector and a subtraction or cancellation point. The noise suppressor can include a frequency domain converter, noise estimator and suppression control, a multi-channel noise suppression point, and a time domain converter. The adaptive echo and noise control system can further be configured to adaptively determine the order of noise suppression and echo cancellation by comparing the background noise to at least one threshold, performing echo cancellation prior to noise suppression on the signal if the background noise is below the at least one threshold, and performing noise suppression prior to echo cancellation on the signal if the background noise is above the at least one threshold.

The adaptive echo and noise control system can additionally be configured to adaptively determine the order of noise suppression and echo cancellation by performing echo cancellation prior to noise suppression on the signal if the background noise is below a first threshold of the at least one threshold and performing noise suppression prior to echo cancellation on the signal if the background noise is above a second threshold of the at least one threshold. The second threshold can be determined based on a noise threshold when the benefits of suppressing the environmental noise outweigh detriments of the nonlinear effect of noise suppression on echo cancellation. The first threshold can be determined based on a noise threshold when benefits of the nonlinear effect of noise suppression on echo cancellation outweigh detriments of noise suppressing the environmental noise. The second threshold can be greater than the first threshold, for example, to create a hysteresis zone to avoid switching oscillation. The adaptive echo and noise control system can also be configured to set an indicator to indicate a current order of echo cancellation and noise suppression. The amount of noise can be based on an estimated and smoothed noise level when there is no desired input nor acoustic echo received at the audio input of the electronic device.

FIG. 1 is an exemplary block diagram of a communication device 100 according to another embodiment. The communication device 100 may be a mobile communication device such as a cellular phone, or may also be a telephone, a personal computer, a personal digital assistant, or any other device that is capable of sending and receiving communication signals. The communication device 100 can include an audio output 130, an audio input 140, an adaptive echo and noise control system 110, and a controller 120. The communication device 100 may also include a vocoder 150 and a transceiver 160. The transceiver 160 may include a transmitter and/or a receiver. The audio input 140 can include a microphone, an attached speakerphone, a headset, a car kit, or any other audio input device. The audio output 130 can include, a speaker, a transducer, an attached speakerphone, a headset, a car kit, or any other audio output device. All or some of the components may reside within the controller 120. Also, all or some of the components may be implemented as hardware or software.

In operation, the audio output 130 can generate an output acoustic signal. The audio input 140 can receive an input acoustic signal such as speech. The input acoustic signal may include a desired signal component, a noise signal component, and an echo signal component. The controller 120 can control the operations of the communication device 100. For example, the controller 120 can send a command signal to the adaptive echo and noise control system 110 to enable, disable, and control the operation of the adaptive echo and noise control system 110. The vocoder 150 can be used to compress and decompress an audio stream to reduce the bandwidth and/or the data rate of a transmitted signal. The vocoder 150 is not necessary for operation of the communication device 100 depending on the type of communication device being used. The transceiver 160 can transmit and receive signals across a network such as a wireless network, a landline network, a wide area network, or any other communication network. For example, the transceiver 160 can be applicable to wireless or wired telephones. The transceiver 160 can be used for voice over IP, for a cordless phone, for a wireless phone, for a phone with an attached speakerphone, or for any other communication device.

According to one embodiment, the adaptive echo and noise control system 110 can adaptively remove or reduce echo and noise in a signal. For example, the adaptive echo and noise control system 110 can adaptively remove or reduce echo and noise in the acoustic signal received by the audio input 140. The adaptive echo and noise control system 110 can operate on frame based signals, sampled signals, or any other signal type.

According to a related embodiment, the adaptive echo and noise control system 110 can receive a signal at an input 140 to the communication device 100, determine background noise in the signal, and adaptively determine the order of noise suppression and echo cancellation based on the background noise in the signal. The adaptive echo and noise control system 110 can adaptively determine the order of noise suppression and echo cancellation by comparing the background noise to at least one threshold, performing echo cancellation prior to noise suppression on the signal if the background noise is below the at least one threshold, and performing noise suppression prior to echo cancellation on the signal if the background noise is above the at least one threshold. The background noise can be based on an estimated and smoothed noise level when there is no desired input nor echo received at the input 140 of the communication device 100. The adaptive echo and noise control system 110 can also adaptively determine the order of noise suppression and echo cancellation by performing echo cancellation prior to noise suppression on the signal if the background noise is below a first threshold of the at least one threshold and performing noise suppression prior to echo cancellation on the signal if the background noise is above a second threshold of the at least one threshold. The second threshold can be determined based on a noise threshold when the benefits of suppressing the environmental noise outweigh the detriments of the nonlinear effect of noise suppression on echo cancellation. The first threshold can be determined based on a noise threshold when the detriments of the nonlinear effect of noise suppression on echo cancellation outweigh the benefits of suppressing the environmental noise. The second threshold can be greater than the first threshold, for example, to create a hysteresis zone to avoid switching oscillation. The adaptive echo and noise control system 110 can also set an indicator to indicate a current order of echo cancellation and noise suppression.

According to another embodiment, the adaptive echo and noise control system 110 can receive an acoustic signal at an input 140 to the mobile communication device, the acoustic signal can include a speech component, an echo component, and a noise component, obtain the noise component in the acoustic signal, compare the noise component to at least one threshold, configure the order of echo cancellation and noise suppression to perform echo cancellation prior to noise suppression on the acoustic signal if the noise component is below the at least one threshold to obtain a desired signal, configure the order of echo cancellation and noise suppression to perform noise suppression prior to echo cancellation on the acoustic signal if the noise component is above the at least one threshold to obtain a desired signal, and transmit the desired signal. The adaptive echo and noise control system 110 can also set an indicator to indicate a current order of echo cancellation and noise suppression.

Figure 2:
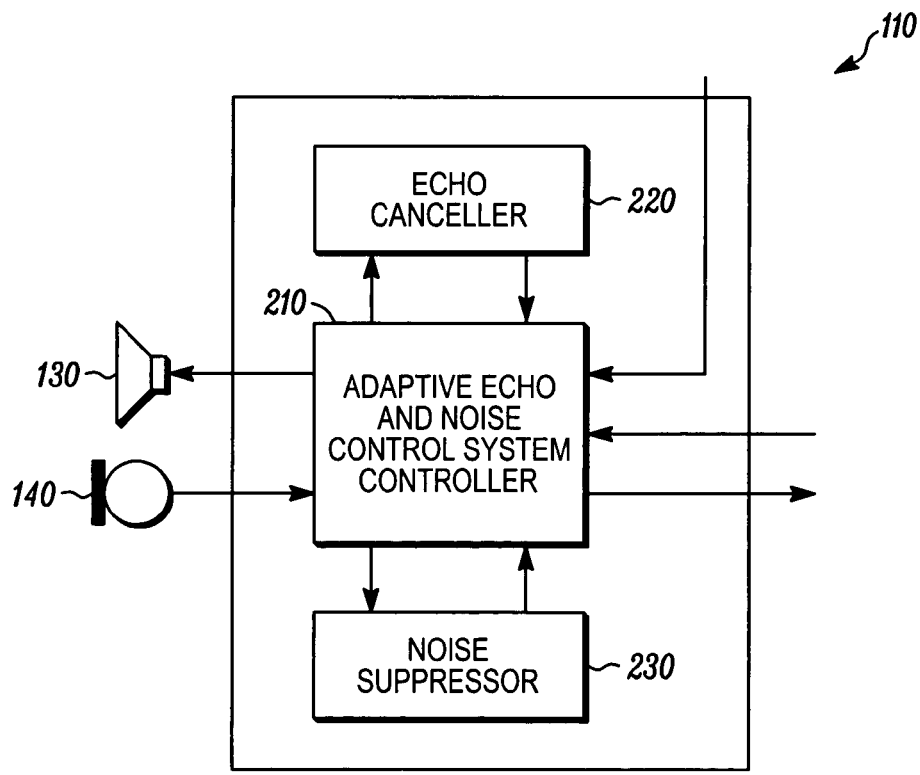
FIG. 2 is an exemplary block diagram of an adaptive echo and noise control system according to a related embodiment.

FIG. 2 is an exemplary block diagram of the adaptive echo and noise control system 110 according to a related embodiment. The adaptive echo and noise control system 110 can include an adaptive echo and noise control system controller 210, an echo canceller 220, and a noise suppressor 230. In operation, the adaptive echo and noise control system controller 210 can control the operations of the adaptive echo and noise control system 110. For example, the adaptive echo and noise control system controller 210 can control the routing of signals to the echo canceller 220 and the noise suppressor 230 to adaptively modify the order of echo cancellation and noise suppression. The echo canceller 220 can adaptively remove and/or reduce acoustic echo in the signal received by the audio input 140. The noise suppressor 230 can adaptively remove and/or reduce background noise in the signal received by the audio input 140. The adaptive echo and noise control system controller 210 can then take the resulting echo cancelled and noise suppressed desired signal and send it to the transceiver 160 for transmission.

Figure 3:
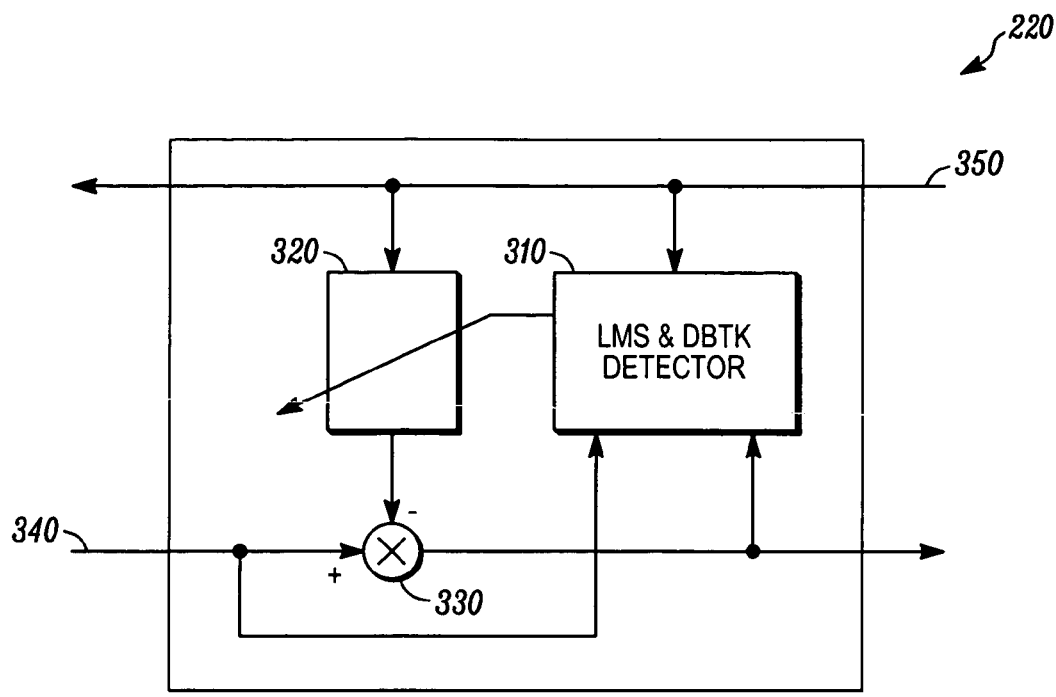
FIG. 3 is an exemplary block diagram of an echo canceller according to a related embodiment.

FIG. 3 is an exemplary block diagram of an echo canceller 220 according to a related embodiment. The echo canceller 220 can include a least mean square (LMS) adaptation control and doubletalk detector 310, an adaptive filter 320, and a cancellation point 330. In operation, the LMS adaptation control and doubletalk detector 310 can control the adaptive filter 320 based on an input signal 340, an echo residue signal and based on a signal received from the transceiver 160 at the input 350. This echo residue signal can be based on signal energy from the input 340 and signal energy from the echo cancelled signal after the cancellation point 330. The cancellation point 330 can subtract the output of the adaptive filter 320 from the signal at the input 340 to obtain the echo cancelled signal.

Figure 4:
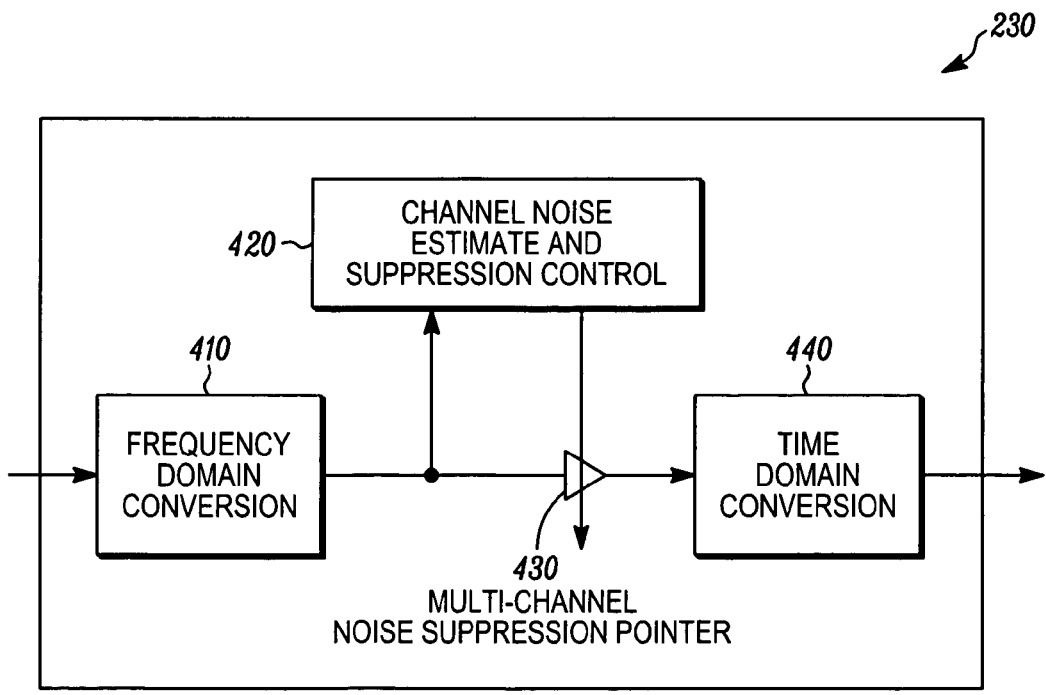
FIG. 4 is an exemplary block diagram of a noise suppressor according to a related embodiment.

FIG. 4 is an exemplary block diagram of a noise suppressor 230 according to a related embodiment. The noise suppressor 230 can include a frequency domain converter 410, channel noise estimate and adaptive suppression control block 420, multi-channel noise suppression point 430, and a time domain converter 440. In operation the noise suppressor 230 can receive a signal including a desired signal portion and an undesired signal portion. For example, the signal can include speech and noise. The frequency domain converter 410 can convert the input signal from time domain to frequency domain, for example, using a fast Fourier transformation (FFT). The channel noise estimate and suppression control block 420 can include voice activity detection (VAD). It generates a noise estimate based on the input signal and controls the multi-channel noise suppression point 430 to adaptively and selectively suppress the environmental noise in the different frequency channels. The time domain converter 440 can convert the noise suppressed signal from frequency domain to time domain for generating the output signal. It is to be understood that the noise estimate and suppression can also be carried out in the time domain to remove or reduce the undesired signal portion.

Figure 5:
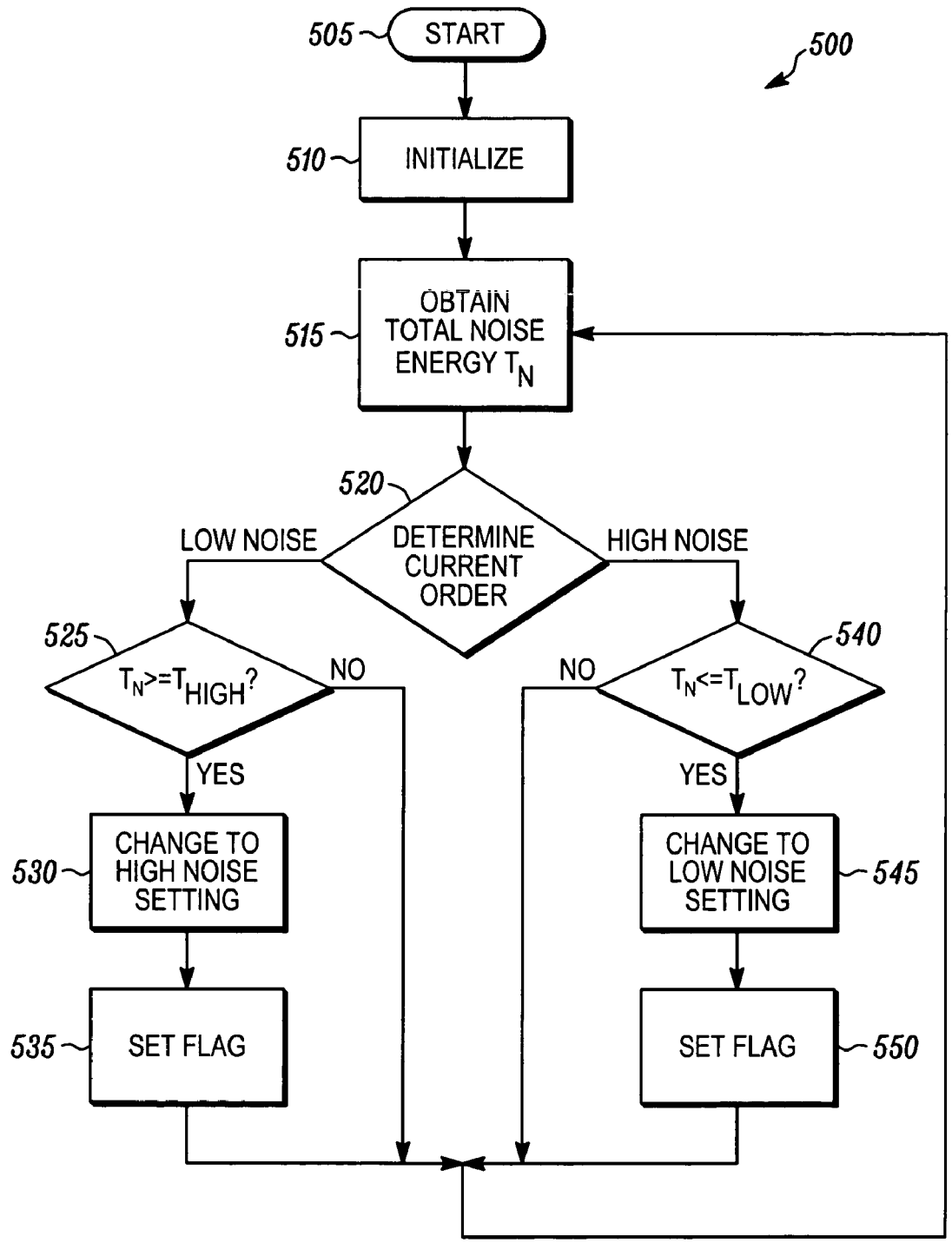
FIG. 5 is an exemplary flowchart illustrating the operation of the adaptive echo and noise control system according to one embodiment.
Figure 6:
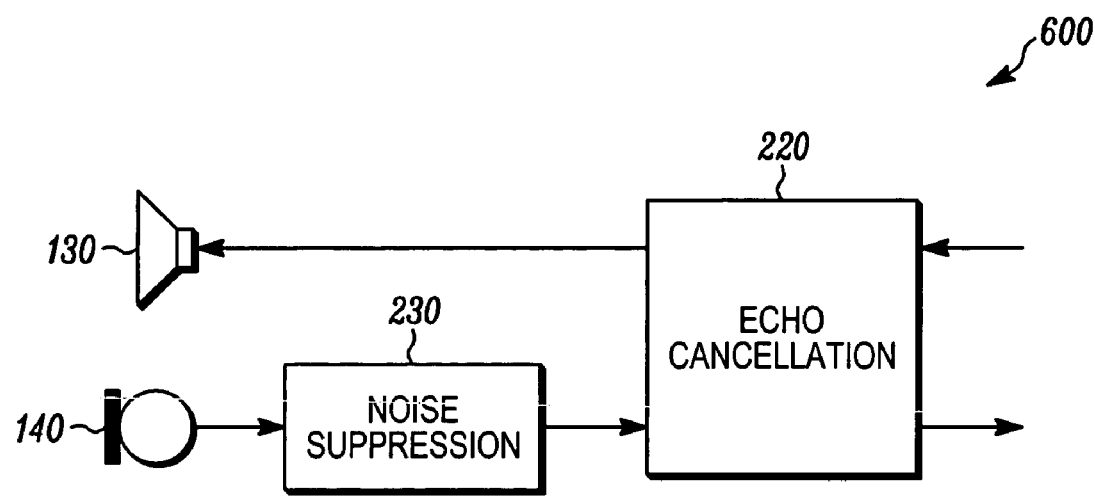
FIG. 6 is an exemplary block diagram of a high noise setting of the adaptive echo and noise control system according to one embodiment.

FIG. 5 is an exemplary flowchart 500 illustrating the operation of the adaptive echo and noise control system 110 according to another embodiment. In step 505, the flowchart begins. In step 510, the adaptive echo and noise control system 110 intializes the echo canceller 220, the noise suppressor 230, and the initial order of echo canceller and noise suppression processing. For example, the adaptive echo and noise control system 110 can set an indicator, such as a flag, to indicate a current order of noise suppression and echo cancellation. According to one embodiment, the order is originally set for a low noise order where echo cancellation is performed before noise suppression. This order can be useful in a low noise environment because noise suppression can be a non-linear process that can cause a detrimental effect on echo cancellation. However, in a high noise environment, the benefits of noise suppression outweigh the detrimental effect. Thus, the order can be reversed for a high noise environment. In step 515, the adaptive echo and noise control system 110 can obtain a current total noise level determined by the noise suppressor 230, for example, by a summation of the noise signal energy of all or some frequency channels Also, smoothing of the total noise energy $T_N$ can be performed based on low-pass filtering the noise level for smoother operation. In step 520, the adaptive echo and noise control system 110 can determine a current order of noise suppression and echo cancellation. For example, the order can be determined based on the indicator set in step 510. If the adaptive echo and noise control system 110 determines the order is a low noise order, in step 525, the adaptive echo and noise control system 110 determines if the total noise energy is greater than or equal to a high noise threshold $T_{HIGH}$. If not, the adaptive echo and noise control system 110 maintains the current low noise status and continues the process in step 515. If so, in step 530, the adaptive echo and noise control system 110 switches to a high noise setting. For example, the adaptive echo and noise control system 110 can switch to a high noise setting by first noise suppressing an incoming signal, then echo canceling the noise suppressed signal as illustrated in FIG. 6. In step 535, the adaptive echo and noise control system 110 can set an indicator or flag to indicate the high noise setting and returns to step 515.

Figure 7:
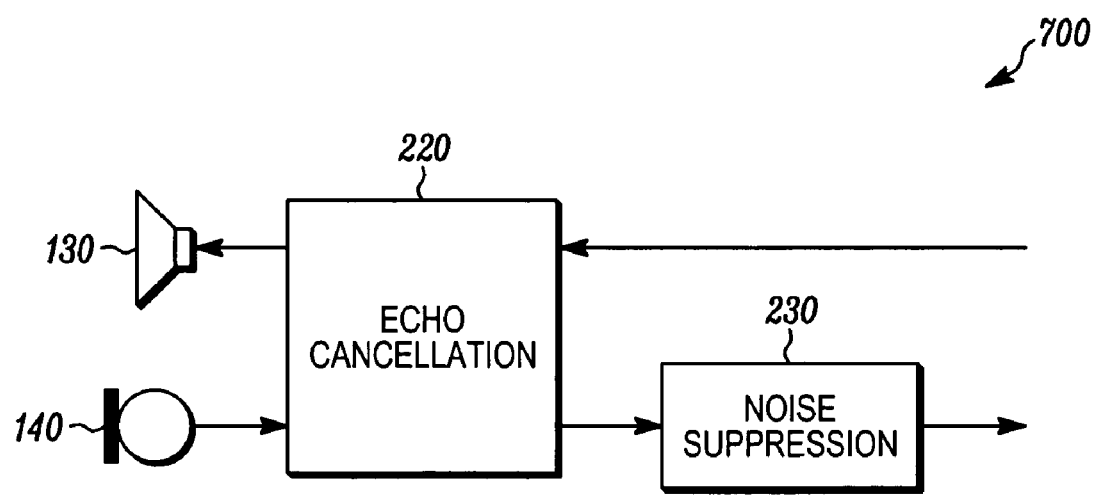
FIG. 7 is an exemplary block diagram of a low noise setting of the adaptive echo and noise control system according to one embodiment.

If, in step 520, the adaptive echo and noise control system 110 determines the current order is a high noise order, in step 540, the adaptive echo and noise control system 110 determines if the total noise energy is less than or equal to a low noise threshold $T_{LOW}$. The low noise threshold may be equal to or less than the high noise threshold. For example, the low noise threshold and the high noise threshold may be equal for ease of determination. Alternately, low noise threshold and the high noise threshold may be different for better system stability. Both the low noise threshold and the high noise threshold may be determined based on experimentation to determine their optimal values. If the total noise energy is not less than or equal to the low noise threshold, the adaptive echo and noise control system 110 maintains the current high noise status and continues the process in step 515. If, in step 540, the total noise energy is less than or equal to the low noise threshold, in step 545, the adaptive echo and noise control system 110 switches to a low noise setting. For example, the adaptive echo and noise control system 110 can switch to a low noise setting by first echo canceling an incoming signal, then noise suppressing the echo cancelled signal as illustrated in FIG. 7. In step 550, the adaptive echo and noise control system 110 can set an indicator or flag to indicate the low noise setting and can return to step 515.

The method of this invention is preferably implemented on a programmable processor. However, the controller 120, the adaptive echo and noise control system 110, and/or any other components of the communication device 100 the may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the invention by simply employing the elements of the independent claims. Accordingly, the preferred embodiments of the invention as set forth herein are intended to be illustrative, not limiting. Various changes may be made without departing from the spirit and scope of the invention.

What is claimed is:

1. A method for echo and noise control in a communication device, comprising:
   receiving a signal at an input to the communication device;
   determining background noise in the signal; and
   adaptively determining an order of noise suppression and echo cancellation based on the background noise in the signal.

2. The method according to claim 1, wherein the step of adaptively determining the order of noise suppression and echo cancellation further comprises:
   comparing the background noise to at least one threshold;

performing echo cancellation prior to noise suppression on the signal if the background noise is below the at least one threshold; and performing noise suppression prior to echo cancellation on the signal if the background noise is above the at least one threshold.

3. The method according to claim 2, wherein the background noise is based on an estimated noise level when there is no desired input received at the input of the communication device.

4. The method according to claim 2, wherein the step of adaptively determining the order of noise suppression and echo cancellation further comprises:

performing echo cancellation prior to noise suppression on the signal if the background noise is below a first threshold of the at least one threshold; and performing noise suppression prior to echo cancellation on the signal if the background noise is above a second threshold of the at least one threshold.

5. The method according to claim 4, wherein the second threshold is determined based on a noise threshold when benefits of suppressing the environmental noise outweigh detriments of the nonlinear effect of noise suppression on echo cancellation.

6. The method according to claim 4, wherein the first threshold is determined based on a noise threshold when detriments of the nonlinear effect of noise suppression on echo cancellation outweigh benefits of noise suppressing the environmental noise.

7. The method according to claim 4, wherein the second threshold is greater than the first threshold.

8. The method according to claim 1, further comprising setting an indicator to indicate a current order of echo cancellation and noise suppression.

9. An electronic device, comprising:

an audio input configured to receive a received signal;
an audio output configured to output an output signal;
a transceiver configured to transmit a transmitted signal; and
an adaptive echo and noise control system coupled to the audio input, the audio output, and the transceiver, the adaptive echo and noise control system including
an echo canceller; and
a noise suppressor,
wherein the adaptive echo and noise control system is configured to adaptively determine an order of echo cancellation and noise suppression based on an amount of noise in the received signal to generate a desired signal, and
wherein the adaptive echo and noise control system is further configured to send the desired signal to the transceiver.

10. The electronic device according to claim 9, wherein the echo canceller comprises:

an adaptive filter
a least mean square adaption control and doubletalk detector; and
a cancellation point.

11. The electronic device according to claim 9, wherein the noise suppressor comprises:

a frequency domain converter,
a noise estimator and adaptive noise suppression controller,
a multi-channel noise suppression point; and
a time domain converter.

12. The electronic device according to claim 9, wherein the adaptive echo and noise control system is further configured to adaptively determine the order of noise suppression and echo cancellation by comparing the background noise to at least one threshold,
performing echo cancellation prior to noise suppression on the signal if the background noise is below the at least one threshold, and
performing noise suppression prior to echo cancellation on the signal if the background noise is above the at least one threshold.

13. The electronic device according to claim 12, wherein the adaptive echo and noise control system is further configured to adaptively determine the order of noise suppression and echo cancellation by performing echo cancellation prior to noise suppression on the signal if the background noise is below a first threshold of the at least one threshold, and
performing noise suppression prior to echo cancellation on the signal if the background noise is above a second threshold of the at least one threshold.

14. The electronic device according to claim 13, wherein the second threshold is determined based on a noise threshold when benefits of suppressing the environmental noise outweigh detriments of the nonlinear effect of noise suppression on echo cancellation.

15. The electronic device according to claim 13, wherein the first threshold is determined based on a noise threshold when detriments of the nonlinear effect of noise suppression on echo cancellation outweigh benefits of noise suppressing the environmental noise.

16. The electronic device according to claim 13, wherein the second threshold is greater than the first threshold.

17. The electronic device according to claim 9, wherein the adaptive echo and noise control system is further configured to set an indicator to indicate a current order of echo cancellation and noise suppression.

18. The electronic device according to claim 9, wherein the amount of noise is based on an estimated noise level when there is no desired input received at the audio input of the electronic device.

19. A method for echo cancellation and noise suppression in a mobile communication device, comprising:

receiving an acoustic signal at an input to the mobile communication device, the acoustic signal including a speech component, an echo component, and a noise component;
obtaining the noise component in the acoustic signal;
comparing the noise component to at least one threshold;
configuring the order of echo cancellation and noise suppression to perform echo cancellation prior to noise suppression on the acoustic signal if the noise component is below the at least one threshold to obtain a desired signal;
configuring the order of echo cancellation and noise suppression to perform noise suppression prior to echo cancellation on the acoustic signal if the noise component is above the at least one threshold to obtain a desired signal; and
transmitting the desired signal.

20. The method according to claim 19, further comprising setting an indicator to indicate a current order of echo cancellation and noise suppression.

* * * * *